(12) United States Patent
Fernandez Orellana et al.

(10) Patent No.: US 11,928,855 B2
(45) Date of Patent: Mar. 12, 2024

(54) METHOD, DEVICE, AND COMPUTER PROGRAM PRODUCT FOR VIDEO PROCESSING

(71) Applicant: Dell Products L.P., Round Rock, TX (US)

(72) Inventors: Pedro Fernandez Orellana, Shanghai (CN); Qiang Chen, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 17/572,203

(22) Filed: Jan. 10, 2022

(65) Prior Publication Data

US 2023/0186608 A1    Jun. 15, 2023

(30) Foreign Application Priority Data

Dec. 14, 2021    (CN) .......................... 202111531776.2

(51) Int. Cl.
*G06V 10/774* (2022.01)
*G06V 10/778* (2022.01)
(Continued)

(52) U.S. Cl.
CPC ........ *G06V 10/774* (2022.01); *G06V 10/7788* (2022.01); *G06V 20/46* (2022.01); *H04N 7/0117* (2013.01)

(58) Field of Classification Search
CPC .. G06V 10/774; G06V 10/7788; G06V 20/46; H04N 7/0117; G06T 3/40
See application file for complete search history.

(56) References Cited

U.S. PATENT DOCUMENTS 11,445,168 B1 *    9/2022  Wei .................... H04N 17/00
2018/0139458 A1 *  5/2018  Wang .................. G06T 3/4053
(Continued)

OTHER PUBLICATIONS

Wikipedia, "Google Stadia," https://en.wikipedia.org/wiki/Google_Stadia, Aug. 11, 2021, 15 pages.
(Continued)

*Primary Examiner* — Md K Talukder
(74) *Attorney, Agent, or Firm* — Ryan, Mason & Lewis, LLP

(57) ABSTRACT

Embodiments of the disclosure include a method, a device, and a computer program product for video processing. This method includes: selecting frames having features of a first type from a first instance of a video as a first candidate set, the first instance having a first resolution; generating a set of training frames based at least on the first candidate set; acquiring a set of corresponding frames for the set of training frames in a second instance of the video, the second instance having a second resolution lower than the first resolution; and determining, using the set of training frames and the set of corresponding frames, a conversion parameter for conversion from the second resolution to a third resolution. This solution provides a smaller-scale and higher-quality training set for the training of a video conversion model, thus improving the quality of training while saving computational resources and increasing training speed.

20 Claims, 4 Drawing Sheets

(51) Int. Cl.
  *G06V 20/40* (2022.01)
  *H04N 7/01* (2006.01)

(56) References Cited

U.S. PATENT DOCUMENTS

| | | | |
|---|---|---|---|
| 2019/0130530 A1* | 5/2019 | Schroers | G06T 3/4007 |
| 2022/0327663 A1* | 10/2022 | Al-Shedivat | H04N 21/23439 |
| 2023/0054130 A1* | 2/2023 | Wang | H04N 21/234309 |
| 2023/0186608 A1* | 6/2023 | Fernandez Orellana | G06V 10/7788 348/441 |

OTHER PUBLICATIONS

Wikipedia, "Video Super Resolution," https://en.wikipedia.org/wiki/Video_Super_Resolution, Jun. 27, 2021, 18 pages.

Amazon Web Services, "AI Video Super Resolution," https://www.amazonaws.cn/en/solutions/ai-super-resolution-on-aws/, Feb. 2020, 6 pages.

Wikipedia, "GeForce Now," https://en.wikipedia.org/wiki/GeForce_Now, Jun. 6, 2021, 5 pages.

Wikipedia, "Xbox Cloud Gaming," https://en.wikipedia.org/wiki/Xbox_Cloud_Gaming, Aug. 9, 2021, 7 pages.

C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.

Wikipedia, "Nvidia Shield TV," https://en.wikipedia.org/wiki/Nvidia_Shield_TV, Jun. 24, 2021, 3 pages.

U.S. Appl. No. 17/400,350 filed in the name of Qiang Chen et al. on Aug. 12, 2021, and entitled "Method, Electronic Device, and Computer Program Product for Video Processing."

\* cited by examiner

METHOD, DEVICE, AND COMPUTER PROGRAM PRODUCT FOR VIDEO PROCESSING

RELATED APPLICATION(S)

The present application claims priority to Chinese Patent Application No. 202111531776.2, filed Dec. 14, 2021, and entitled "Method, Device, and Computer Program Product for Video Processing," which is incorporated by reference herein in its entirety.

FIELD

Embodiments of the present disclosure relate to video technologies and, more specifically, to a method, a device, and a computer program product for video processing.

BACKGROUND

In the process of transmission and storage of video content, it is often necessary to convert content of an original video into a video with a lower resolution through compression and other techniques to save resources such as transmission and storage resources, and to reconstruct the video into a video with a higher resolution when needed. However, it is still a challenge to improve the quality and efficiency of video reconstruction in diversified video content and application scenarios.

SUMMARY

In a first aspect of the present disclosure, a method for video processing is provided, including: selecting frames having features of a first type from a first instance of a video as a first candidate set, the first instance having a first resolution; generating a set of training frames based at least on the first candidate set; acquiring a set of corresponding frames for the set of training frames in a second instance of the video, the second instance having a second resolution lower than the first resolution; and determining, using the set of training frames and the set of corresponding frames, a conversion parameter for conversion from the second resolution to a third resolution.

In a second aspect of the present disclosure, an electronic device is provided that includes a processor and a memory coupled to the processor, wherein the memory has instructions stored therein that, when executed by the processor, cause the device to perform actions including: selecting frames having features of a first type from a first instance of a video as a first candidate set, the first instance having a first resolution; generating a set of training frames based at least on the first candidate set; acquiring a set of corresponding frames for the set of training frames in a second instance of the video, the second instance having a second resolution lower than the first resolution; and determining, using the set of training frames and the set of corresponding frames, a conversion parameter for conversion from the second resolution to a third resolution.

In a third aspect of the present disclosure, a computer program product is provided, the computer program product is tangibly stored on a computer-readable medium and includes machine-executable instructions that, when executed by a machine, cause the machine to perform the method according to the first aspect of the present disclosure.

It should be noted that this Summary is provided to introduce a selection of concepts in a simplified manner, which will be further described in the Detailed Description below. The Summary is neither intended to identify key features or major features of the present disclosure, nor intended to limit the scope of the present disclosure.

BRIEF DESCRIPTION OF THE DRAWINGS

By description of example embodiments of the present disclosure provided in detail herein with reference to the accompanying drawings, the above and other objectives, features, and advantages of the present disclosure will become more apparent, where.

In all the drawings, the same or similar reference numerals represent the same or similar elements.

DETAILED DESCRIPTION

Figure 1:
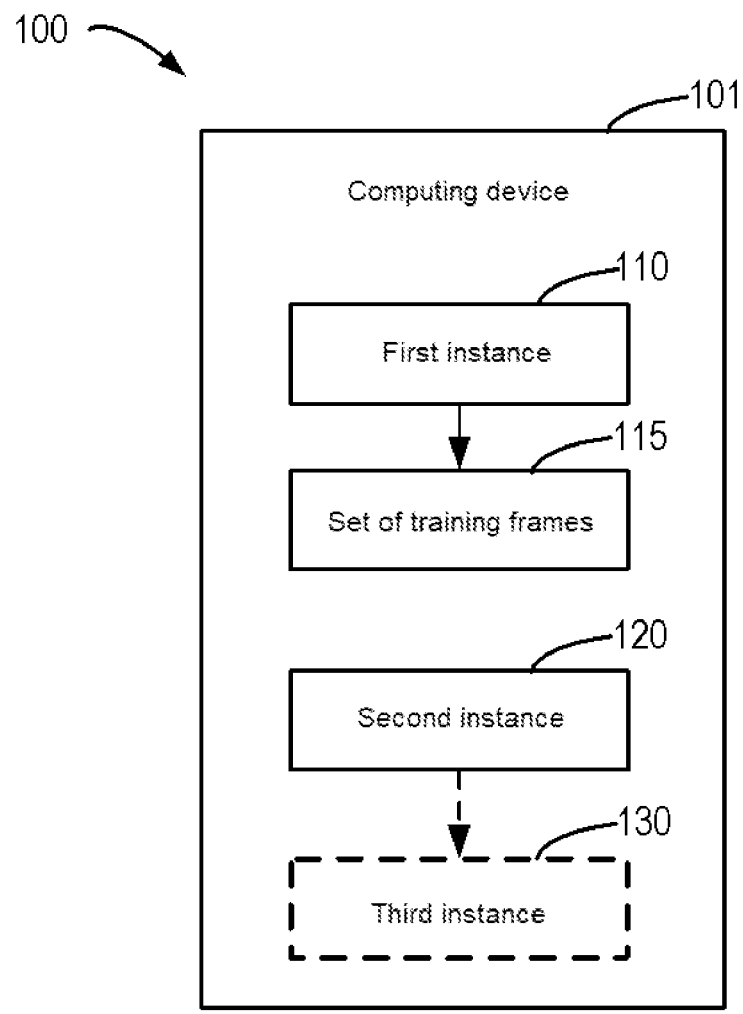
FIG. 1 illustrates a schematic diagram of an example environment in which embodiments of the present disclosure may be implemented.

The following will describe the embodiments of the present disclosure in more detail with reference to the accompanying drawings. While some embodiments of the present disclosure are shown in the accompanying drawings, it should be understood, however, that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are examples only and are not intended to limit the scope of protection of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." Relevant definitions of other terms will be given in the description below.

The term "Video Super Resolution" or VSR refers to the construction or reconstruction of video data having a higher resolution (e.g., original resolution) from (e.g., compressed) video data having a lower resolution through technical means. A compressed video is much smaller than an original video (e.g., a ×4 reduction of video frames may roughly reduce the video to $\frac{1}{16}$ of the original video size). As a result, in multiple fields related to video (e.g., video transmission and streaming, video conferencing, remote gaming, etc.), a video with a lower resolution is often transmitted or stored and, when needed, a video with a higher resolution is reconstructed in combination with the VSR technology.

In application fields such as VSR, a conversion model (e.g., a deep neural network-based model) is often used for conversion between different resolution versions of a video. In order to train a model to determine the conversion parameter of the model, etc., video frames containing scenes and visual patterns need to be provided as training data so that the model can learn how to convert (e.g., reconstruct) various features therein. A conventional strategy is to extract all frames from both a high-resolution version (e.g., the original version) and a low-resolution version (e.g., the compressed version) of the same video content and generate pairs of high-resolution frames and low-resolution frames as samples in the training data. However, using the original frames from the video directly for training requires a large amount of computational resources and a long training time. For example, a medium-sized video contains tens of thousands of frames (e.g., 10 minutes at 60 frames/sec=36,000 frames), and a large-sized video/movie contains hundreds of thousands of frames. The original format of these frames may possibly take up as much as 100 GB of storage space. It may possibly take hours to train all the original frames extracted from the video just once (pass/epoch), while a full training cycle usually requires tens or even hundreds of training passes. For this, high-end graphics processors and large clusters of memory and storage space are required.

In addition, the set of original frames is often imbalanced and contains a large amount of redundant content (e.g., the same scene), which is particularly common in sets of frames from various real-life videos. Unlike duplicate data, this redundant content cannot simply be detected and eliminated using methods such as hash-based methods. For example, in a video used to train a VSR model, a character's face may possibly appear in thousands of frames, but none of them are exactly the same. However, selecting some of these representative frames may possibly be sufficient for model training.

The aforementioned imbalance may also affect the training quality of the model, making the model unnecessarily learn redundant content too much while insufficiently learning content that appears less frequently. For example, in almost all videos, there are elements or scenes that rarely appear. The data that includes these elements or scenes is often referred to as long-tail data. The long-tail data only accounts for a small part of the entire video and is thus often insufficiently learned by the model when the model is trained using the set of original frames, resulting in poor performance of the model when it converts various features contained in the long-tail data. For example, a VSR model may possibly not be able to reconstruct with high quality a structure on a Coke can that rarely appears in a video. However, long-tail data may possibly contain critical information or important elements. For example, some characters may possibly only appear for a short time in the training video (e.g., road signs that appear for 2 seconds, subscripts that appear for 3 seconds, etc.), but when these characters are of poor quality in the reconstructed video, they are easy to be found and lead to poor perceptual experience.

To at least partially address the above and other potential problems, embodiments of the present disclosure provide a solution for video processing. The solution uses a series of feature selection functions to select frames that are most relevant to a training target from a set of video frames, and generates a training set based on these frames for use in the training of a video conversion model. A summary pipeline formed by these functions may identify features that are relevant/irrelevant to the training target and retain/not retain them in the training data. This solution may significantly reduce the number of training frames (depending on the characteristics of the video, for example, in some cases a reduction of up to 95% may be achieved). Meanwhile, important features that appear less frequently in the original video may be preserved, thus avoiding imbalanced learning. As a result, this solution improves the quality of training while saving the computational resources required for preprocessing and training and increasing the speed of training.

FIG. 1 illustrates a schematic diagram of environment 100 in which embodiments of the present disclosure can be implemented. Environment 100 includes computing device 101, where computing device 101 is configured to select training data from a set of frames containing video content of different resolutions and to use the selected training data to train a video conversion model (e.g., a VSR model). Computing device 101 may be, for example, a device on a platform of a video provider or a device of a third party that provides services to the video provider. In some cases, computing device 101 may also be a device associated with a video recipient. Although illustrated as a single device, computing device 101 may also be a plurality of devices, a virtual device, or any other form of device or devices suitable for implementing embodiments of the present disclosure.

For illustrative purposes, also shown in FIG. 1 are different video instances in environment 100, i.e., first instance 110 and second instance 120. First instance 110 is a first version of the video content with a higher first resolution. Second instance 120 is another version of the same video content with a lower second resolution. For example, in some cases, first instance 110 may be the original version of the video, while second instance 120 may be a version acquired from first instance 110 using downsampling.

According to an embodiment of the present disclosure, computing device 101 may use pairs of frames selected from a set of training frames 115 of first instance 110 and corresponding frames in second instance 120 as training samples, and use these training samples to train a conversion model for the video to determine various conversion parameters of the model. In addition, in some embodiments, as will be described below, computing device 101 may also optionally use the determined conversion parameters to convert second instance 120 to third instance 130 for use or to evaluate the quality of the conversion parameters. Computing device 101 may perform the above processes using the method according to embodiments of the present disclosure, which will be described in more detail below in conjunction with other accompanying drawings.

It should be understood that environment 100 is described for illustrative purposes only and does not imply any limitation to the scope of the present disclosure. Environment 100 may also include devices, components, and other entities not shown in FIG. 1. In addition, embodiments of the present disclosure may also be applied in an environment different from environment 100.

Figure 2:
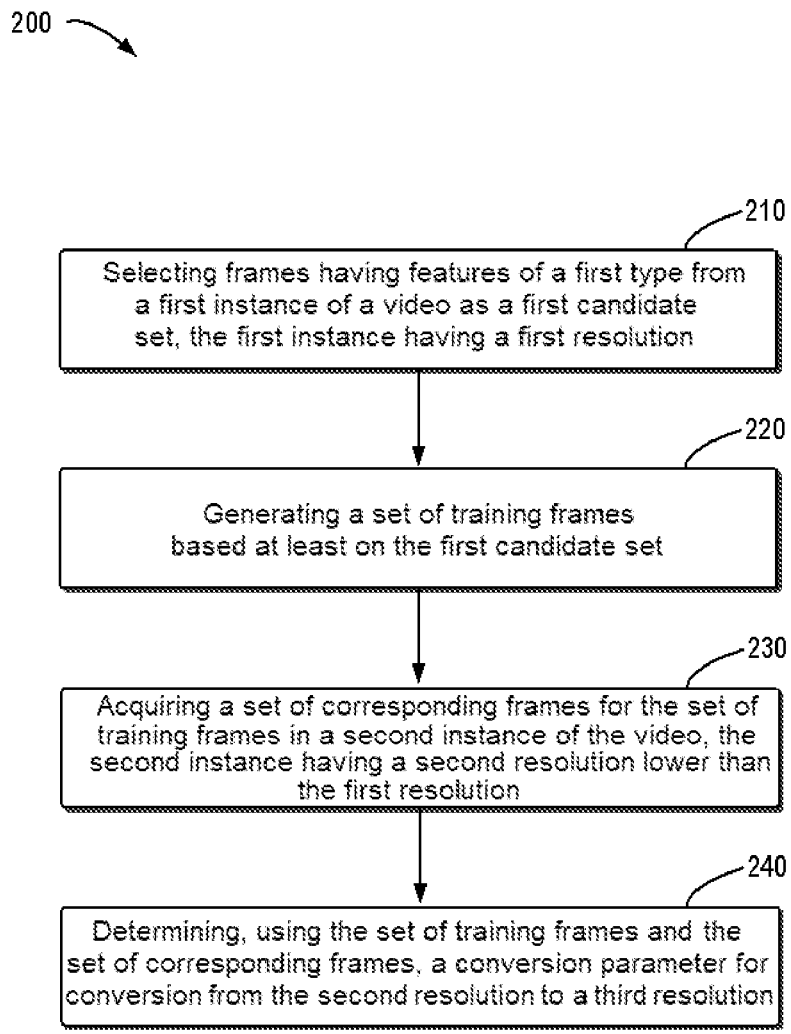
FIG. 2 illustrates a flow chart of a method for video processing according to some embodiments of the present disclosure.

FIG. 2 illustrates a flow chart of example method 200 for video processing according to some embodiments of the present disclosure. Method 200 may be performed, for example, by computing device 101 (more specifically, a processor of computing device 101). It should be understood that method 200 may also include additional actions that are not shown. Method 200 is described in detail below with reference to FIG. 1.

At block 210, computing device 101 selects frames having features of a first type from first instance 110 as a first candidate set. This is to select training data for training a video conversion model. In some embodiments, computing device 101 may use a corresponding pattern recognition method to select frames having features of the first type. For example, in some embodiments, computing device 101 may use a face recognition algorithm to select frames that have a face from first instance 110.

In some embodiments, the specific type of features of the first type may be determined, for example, based on factors such as the type of content (e.g., movies, games, etc.), characteristics (e.g., the style of a movie), and application fields of a model to be trained (e.g., online games, teleconferences, etc.) contained in first instance 110.

For example, assume that first instance 110 is a movie video and that the captions therein are embedded directly in the frames as a part of the images (rather than as separate metadata). At this point, computing device 101 may use the embedded caption recognition method to select frames in first instance 110 that include captions. Embedded caption recognition may be considered a specific example of optical character recognition (OCR). In some other embodiments, computing device 101 may also use other OCR methods to select frames with other types of characters, such as road signs.

As another example, first instance 110 may be a game video for the reconstruction of training game video streams. At this point, the region of interest that gamers are most concerned about in the video is highly correlated with the training target. Thus, in some such embodiments, computing device 101 may use a region-of-interest recognition method to select frames from first instance 110 that include a region of interest. The scope of the present disclosure is not limited to specific feature types and specific methods for selecting frames with those types.

At block 220, computing device 101 generates the set of training frames 115 based at least on the first candidate set. In the simplest embodiment, computing device 101 may use the first candidate set as the set of training frames 115. In various embodiments, method 200 may also include further filtering of the first candidate set by computing device 101 prior to using the first candidate set as the set of training frames 115 or a portion thereof, which will be detailed below.

In some embodiments, computing device 101 may identify frames from the first candidate set that have features of another type (referred to herein as a second type), and remove frames that do not have features of the second type from the first candidate set. For example, after selecting the first candidate set with faces as features of the first type, computing device 101 may further identify frames with blue eyes therefrom and retain only those frames in the first candidate set. It will be understood that, in the same manner, computing device 101 may also retain in the first candidate set only those frames that have more types of features at the same time.

In some embodiments, computing device 101 may also identify frames from the first candidate set that have features of another type (referred to herein as a third type) and remove these frames from the first candidate set. This operation is particularly beneficial in embodiments where there is a large amount of redundant content in the video. For example, computing device 101 may use most-common-object/background recognition methods to identify one or more features that repeatedly appear in large numbers in the first candidate set (such as faces of the same person that appear with only minor differences in thousands of frames) and remove the redundant frames that include these features from the first candidate set. In this way, computing device 101 can avoid imbalanced training later on due to providing too many identical features in the set of training frames 115 generated based on the first candidate set.

It is often necessary to include a plurality of types of features in the set of training frames 115 for use in model learning. For example, a model for reconstructing a video stream of an online meeting may possibly need to fully learn the faces of attendees in the video as well as a whiteboard used for writing at the meeting site. In some such embodiments, method 200 may also include the following steps: computing device 101 selects frames having features of a fourth type from first instance 110 as a second candidate set, and generates the set of training frames 115 based on the first candidate set and the second candidate set. Computing device 101 may select the second candidate set in a manner similar to the manner in which the first candidate set is selected as described above, and further filter the second candidate set.

In some embodiments, in the manner as described above, computing device 101 may also select additional candidate sets from first instance 110 as portions of the set of training frames 115. In these embodiments, computing device 101 may select the set of training frames 115 from first instance 110 using a plurality of different application-specific recognition methods and an appropriate combination of the selection steps described above. From a high-level perspective, such an entire process of generating the set of training frames 115 may be considered as a summary pipeline formed by a series of cascading selection functions. At each step (i.e., selection function) of the pipeline, computing device 101 may identify and select a portion of the frames of first instance 110 in various ways as described above. Example pipeline 300 for generating the set of training frames 115 according to an embodiment of the present disclosure will be described in more detail later with reference to FIG. 3.

Still referring to FIG. 2, at block 230, computing device 101 acquires a set of corresponding frames for the set of training frames 115 in second instance 120. In some cases, to improve the training quality, computing device 101 may correspond a (higher-resolution) frame in the set of training frames 115 to a plurality of frames in (lower-resolution) second instance 120. As an example, computing device 101 may use a moving window to select corresponding frames in the time sequence of frames of second instance 120. For example, for a frame in the set of training frames 115 that is the Nth in the time sequence of frames of first instance 110, computing device 101 may acquire frames in the interval [N−a, N+b] of the time sequence of second instance 120 as its corresponding frames. The integers a and b that specify the size of the moving window may vary with specific implementations. It should be understood that the method of selecting a set of corresponding frames may also vary with specific implementations, and the method of the present disclosure is not subject to this limitation.

At block 240, computing device 101 determines, using the set of training frames 115 and the set of corresponding frames, a conversion parameter for conversion from the second resolution to a third resolution. The third resolution is a resolution different from the second resolution. For example, in VSR reconstruction, computing device 101 may use pairs of frames in the set of training frames 115 and their corresponding frames as training samples to train a video reconstruction model to determine its parameters, where the video reconstruction model is used to reconstruct a video with the second resolution (e.g., compressed video) into a video with the third resolution (e.g., original resolution) that is higher than the second resolution. The third resolution may be the same as the first resolution or different from the first resolution. The method of the present disclosure is not limited by specific forms of the conversion model or specific values of the resolutions. In some embodiments, computing device 101 may disorder the training samples and feed training pairs in small batches to the video model to be trained until the model converges, thereby determining the conversion parameters of the model.

Figure 3:
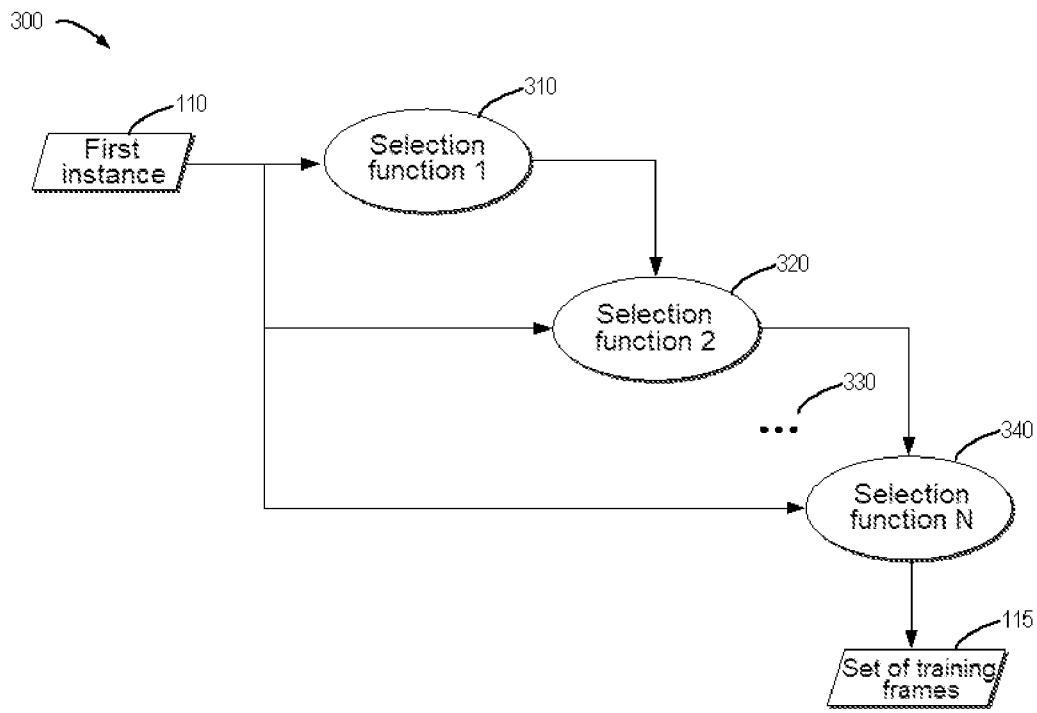
FIG. 3 illustrates a non-limiting example pipeline for generating a set of training frames according to some embodiments of the present disclosure.

FIG. 3 illustrates non-limiting example pipeline 300 according to some embodiments of the present disclosure, where example pipeline 300 is used to generate the set of training frames 115 from first instance 110 of FIG. 1. Example pipeline 300 may be used by computing device 101 in, for example, blocks 210 and 220 of method 200 of FIG. 2. Example pipeline 300 will be described in detail below with reference to FIG. 1.

Using selection function 1 310, computing device 101 selects frames having features of the first type from frames of first instance 110 as the first candidate set. Taking a video conference as an example, these frames may be frames with faces.

Computing device 101 then delivers first instance 110 and the first candidate set selected using selection function 1 310 to selection function 2 320. Depending on the specific implementation, selection function 2 320 may be any of the following operations performed by computing device 101: identifying frames from the first candidate set that have features of the second type (e.g., blue eyes) and removing the frames that do not have features of the second type from the first candidate set; identifying frames from the first candidate set that have features of the third type (e.g., faces of a person that repeatedly appear in large numbers) and removing those frames from the first candidate set; or selecting frames from first instance 110 that have features of a fourth type (e.g., a writing whiteboard) as the second candidate set.

Ellipsis 330 indicates that pipeline 300 may also include a plurality of selection functions not shown in FIG. 3, for example, selection function 3, selection function 4, ..., and selection function N−1, where the number N depends on a specific application. In generating the set of training frames 115, computing device 101 uses each selection function to further identify frames with additional features from the selected candidate set for retention in or removal from the candidate set, or to select additional candidate sets from first instance 110 for addition to the selected candidate set. For example, computing device 101 may use selection function 3 to remove frames with no characters on the whiteboard from the second candidate set that includes writing whiteboard features. For example, computing device 101 may use selection function 4 to select frames from first instance 110 that have a display screen. Finally, after the selection is made using the final selection function N 340, computing device 101 generates the set of training frames based on the output of pipeline 300. For example, computing device 101 may use the union of a plurality of candidate sets finally output by pipeline 300 as the set of training frames after removing duplicate frames.

It should be understood that the selection functions in pipeline 300 and the order in which these functions are used are mentioned above as examples only. Depending on the type and nature of first instance 110, the field to which the model to be trained will be applied, etc., computing device 101 may construct pipelines with different selection functions and/or different orders of use of the selection functions. It should also be understood that in pipeline 300, a plurality of functions for selecting a plurality of associated features may be implemented as one function, a plurality of functions for retaining or removing the same type of features in or from a plurality of candidate sets may also be implemented as one function, and one function may include a plurality of sub-functions. In addition to the selection functions, additional functions not shown may also be included in pipeline 300, such as, for example, performing a preliminary redundancy removal operation on first instance 110 prior to preliminary selection of each candidate set from first instance 110.

The summary pipeline constructed according to the embodiments of the present disclosure enables down-selection, using a variety of pattern recognition methods, of frames that should be used for training from an initial set of video frames. Unlike the conventional use of such recognition methods to select the "most informative" content from a human perspective, in the present disclosure, these recognition methods are used in the summary pipeline to select the set of frames that are most likely to allow the model to be trained to learn all the features required for the conversion and to be as concise as possible. This pipeline allows for the retention of unique features that appear less frequently in the training data, the addition of desired features that were not previously selected, and the removal of frames that do not affect or would negatively affect the training of the model, thereby improving the quality of the training data.

Figure 4:
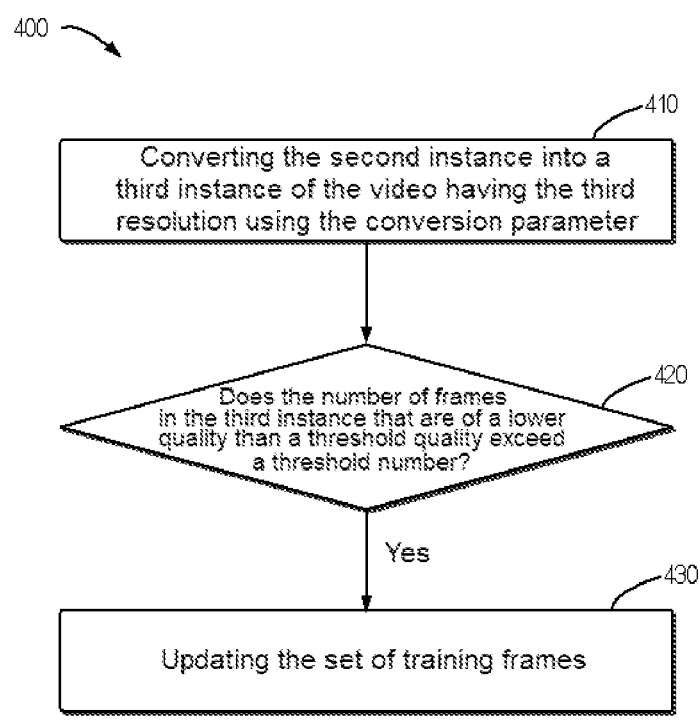
FIG. 4 illustrates a method for updating a set of training frames according to some embodiments of the present disclosure.

After the conversion parameters of the video conversion model have been determined using the method according to the embodiments of the present disclosure, the determined model may be evaluated for quality, and the set of training frames may be updated based on the evaluation result to iteratively train the model. FIG. 4 illustrates example method 400 for updating the selected set of training frames according to some embodiments of the present disclosure. Method 400 may be performed, for example, by computing device 101 shown in FIG. 1, and may be performed after computing device 101 has determined the conversion parameters by means of method 200 of FIG. 2. Method 400 is described in detail below with reference to FIG. 1.

At block 410, computing device 101 may convert, using the determined conversion parameter, second instance 120 to third instance 130 having the third resolution of the video. Taking VSR reconstruction as an example, the computing device may set the determined conversion parameter for a corresponding super-resolution reconstruction model, feed the model with lower-resolution second instance 120 that needs to be reconstructed, and run the model to acquire reconstructed third instance 130 with a higher resolution.

At block 420, computing device 101 may determine whether the number of frames in third instance 130 that are of a lower quality than a threshold quality exceeds a threshold number. In some embodiments, computing device 101 may use SSIM (structural similarity), PSNR (peak signal-to-noise ratio), MSE (mean square error), or any other appropriate algorithms to measure the relationship between the frames of second instance 120 and the frames of third instance 130 to assess the quality of the frames in third instance 130.

If it is determined at block 420 that the number of frames in the third instance 130 that are of a lower quality than the threshold quality exceeds the threshold number, method 400 proceeds to block 430. At block 430, computing device 101 may update the set of training frames 115. In some embodiments, computing device 101 may determine the corresponding frames in first instance 110 for frames in third instance 130 that are of a lower quality than the threshold quality and add those corresponding frames to the set of training frames 115 as the updated set of training frames. For example, computing device 101 may determine the corresponding frames in first instance 110 using a moving window as previously described in conjunction with FIG. 2. The method of the present disclosure is not limited to the specific method of determining corresponding frames herein. Next, the updated set of training frames may be used by computing device 101 to regenerate training pairs to train the model, thereby determining the updated conversion parameter.

In some embodiments, if the number of frames in third instance 130 that are of a lower quality than the threshold quality is determined, computing device 101 may use the method according to the embodiments of the present disclosure to reselect the set of training frames 115 from first instance 110 for use in retraining the video conversion model. For example, computing device 101 may use a recognition method and/or pipeline different from the previously used recognition method and/or pipeline to reselect the set of training frames 115 from first instance 110. The evaluation information acquired at block 420 may be used to adjust the model and/or pipeline used.

Figure 5:
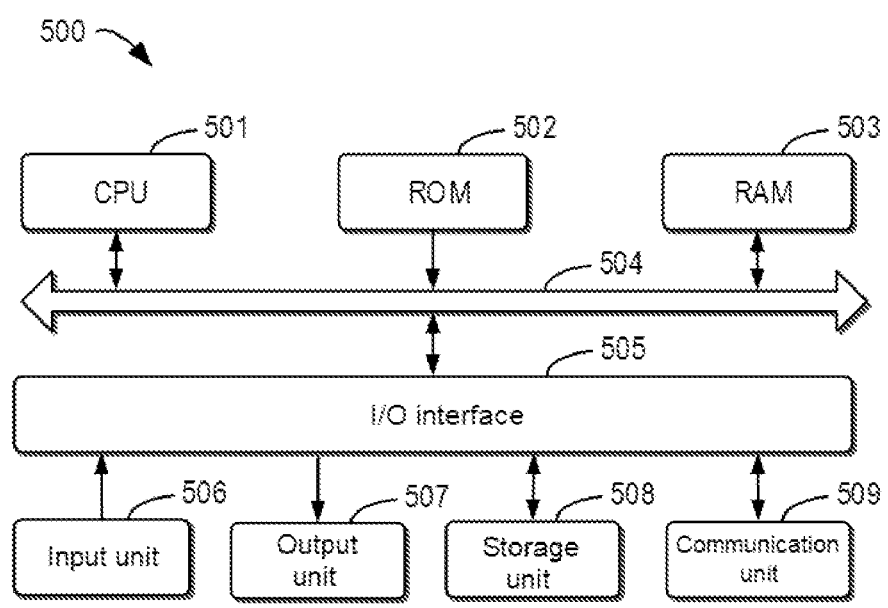
FIG. 5 illustrates a schematic block diagram of a device that may be used to implement embodiments of the present disclosure.

FIG. 5 shows a schematic block diagram of device 500 that may be configured to implement embodiments of the present disclosure. Device 500 may be the device or apparatus described in the embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504. Although not shown in FIG. 5, device 500 may also include a co-processor.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods or processes described above may be performed by CPU 501. For example, in some embodiments, the method may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in the reverse order, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various example embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A method for video processing, comprising:
   selecting frames having features of a first type from a first instance of a video as a first candidate set, the first instance having a first resolution;
   generating a set of training frames based at least on the first candidate set, the selecting and generating being performed as part of a pipelined process in which a series of multiple distinct selection functions are applied to at least portions of the first instance of the video;
   acquiring a set of corresponding frames for the set of training frames in a second instance of the video, the second instance having a second resolution lower than the first resolution; and
   determining, using the set of training frames and the set of corresponding frames, a conversion parameter for conversion from the second resolution to a third resolution.

2. The method according to claim 1, wherein generating the set of training frames comprises:
   generating the set of training frames at least by removing frames not having features of a second type from the first candidate set.

3. The method according to claim 1, wherein generating the set of training frames comprises:
   generating the set of training frames at least by removing frames having features of a third type from the first candidate set.

4. The method according to claim 1, wherein generating the set of training frames comprises:
   selecting frames having features of a fourth type from the first instance as a second candidate set; and
   generating the set of training frames based on the first candidate set and the second candidate set.

5. The method according to claim 1, wherein each of the multiple distinct selection functions of the pipelined process receives a same first portion of the first instance of the video as a first input of that selection function.

6. The method according to claim 5, wherein each of the multiple distinct selection functions other than an initial one of the selection functions receives an output of a previous one of the selection functions as a second input.

7. A method for video processing, comprising:
   selecting frames having features of a first type from a first instance of a video as a first candidate set, the first instance having a first resolution;
   generating a set of training frames based at least on the first candidate set;
   acquiring a set of corresponding frames for the set of training frames in a second instance of the video, the second instance having a second resolution lower than the first resolution;
   determining, using the set of training frames and the set of corresponding frames, a conversion parameter for conversion from the second resolution to a third resolution;
   converting the second instance into a third instance of the video having the third resolution using the conversion parameter; and
   updating the set of training frames if it is determined that the number of frames in the third instance that are of a lower quality than a threshold quality exceeds a threshold number.

8. The method according to claim 7, wherein updating the set of training frames comprises:
   determining corresponding frames in the first instance for the frames in the third instance that are of a lower quality than the threshold quality; and
   adding the corresponding frames in the first instance to the set of training frames to update the set of training frames.

9. An electronic device, comprising:
a processor; and
a memory coupled to the processor, wherein the memory has instructions stored therein that, when executed by the processor, cause the device to execute actions comprising:
selecting frames having features of a first type from a first instance of a video as a first candidate set, the first instance having a first resolution;
generating a set of training frames based at least on the first candidate set, the selecting and generating being performed as part of a pipelined process in which a series of multiple distinct selection functions are applied to at least portions of the first instance of the video;
acquiring a set of corresponding frames for the set of training frames in a second instance of the video, the second instance having a second resolution lower than the first resolution; and
determining, using the set of training frames and the set of corresponding frames, a conversion parameter for conversion from the second resolution to a third resolution.

10. The electronic device according to claim 9, wherein generating the set of training frames comprises:
generating the set of training frames by removing frames not having features of a second type from the first candidate set.

11. The electronic device according to claim 9, wherein generating the set of training frames comprises:
generating the set of training frames by removing frames having features of a third type from the first candidate set.

12. The electronic device according to claim 9, wherein generating the set of training frames comprises:
selecting frames having features of a fourth type from the first instance as a second candidate set; and
generating the set of training frames based on the first candidate set and the second candidate set.

13. The electronic device according to claim 9, wherein the actions further comprise:
converting the second instance into a third instance of the video having the third resolution using the conversion parameter; and
updating the set of training frames if it is determined that the number of frames in the third instance that are of a lower quality than a threshold quality exceeds a threshold number.

14. The electronic device according to claim 13, wherein updating the set of training frames comprises:
determining corresponding frames in the first instance for the frames in the third instance that are of a lower quality than the threshold quality; and
adding the corresponding frames in the first instance to the set of training frames to update the set of training frames.

15. A computer program product tangibly stored on a non-transitory computer-readable medium and including machine-executable instructions that, when executed by a machine, cause the machine to perform a method for video processing, the method comprising:
selecting frames having features of a first type from a first instance of a video as a first candidate set, the first instance having a first resolution;
generating a set of training frames based at least on the first candidate set, the selecting and generating being performed as part of a pipelined process in which a series of multiple distinct selection functions are applied to at least portions of the first instance of the video;
acquiring a set of corresponding frames for the set of training frames in a second instance of the video, the second instance having a second resolution lower than the first resolution; and
determining, using the set of training frames and the set of corresponding frames, a conversion parameter for conversion from the second resolution to a third resolution.

16. The computer program product according to claim 15, wherein generating the set of training frames comprises:
generating the set of training frames at least by removing frames not having features of a second type from the first candidate set.

17. The computer program product according to claim 15, wherein generating the set of training frames comprises:
generating the set of training frames at least by removing frames having features of a third type from the first candidate set.

18. The method according to claim 15, wherein generating the set of training frames comprises:
selecting frames having features of a fourth type from the first instance as a second candidate set; and
generating the set of training frames based on the first candidate set and the second candidate set.

19. The computer program product according to claim 15, further comprising:
converting the second instance into a third instance of the video having the third resolution using the conversion parameter; and
updating the set of training frames if it is determined that the number of frames in the third instance that are of a lower quality than a threshold quality exceeds a threshold number.

20. The computer program product according to claim 17, wherein updating the set of training frames comprises:
determining corresponding frames in the first instance for the frames in the third instance that are of a lower quality than the threshold quality; and
adding the corresponding frames in the first instance to the set of training frames to update the set of training frames.

* * * * *